United States Patent [19]

Egashira et al.

[11] Patent Number: 5,439,227
[45] Date of Patent: Aug. 8, 1995

[54] MULTI-PIECE SOLID GOLF BALL

[75] Inventors: Yoshinori Egashira, Hidaka; Seisuke Tomita, Tokorozawa, both of Japan

[73] Assignee: Bridgestone Sports Co., Ltd., Tokyo, Japan

[21] Appl. No.: 111,338

[22] Filed: Aug. 25, 1993

[30] Foreign Application Priority Data

Aug. 31, 1992 [JP] Japan .................. 4-255535

[51] Int. Cl.⁶ .............................................. A63B 37/06
[52] U.S. Cl. .................... 273/228; 273/235 R; 273/230
[58] Field of Search ............... 273/228, 235 R, 230

[56] References Cited

U.S. PATENT DOCUMENTS 5,184,828 2/1993 Kim et al. .................... 273/228

FOREIGN PATENT DOCUMENTS 2248067 3/1992 United Kingdom ................ 273/228

Primary Examiner—George J. Marlo
Attorney, Agent, or Firm—Sughrue, Mion, Zinn, Macpeak & Seas

[57] ABSTRACT

A multi-piece solid golf ball has a solid core of multi-layer configuration including an inner layer circumscribed by an outer layer. The core inner layer is formed from a rubber composition. The core outer layer is formed thereon by injection molding a mixture of 100-50 wt % of a polyether ester type thermoplastic elastomer having a Shore D hardness of 30-50 and a Tg of up to $-25°$ C. and 0-50 wt % of an ethylene-(meth)acrylate copolymer ionomer having a flexural modulus of 200-400 MPa. The core is surrounded by a cover of an ethylene-(meth)acrylate copolymer ionomer having a flexural modulus of 200-450 MPa and a Shore D hardness of 55-68. The ball shows improved flying performance, feel on impact and durability and lends itself to mass production.

6 Claims, 1 Drawing Sheet

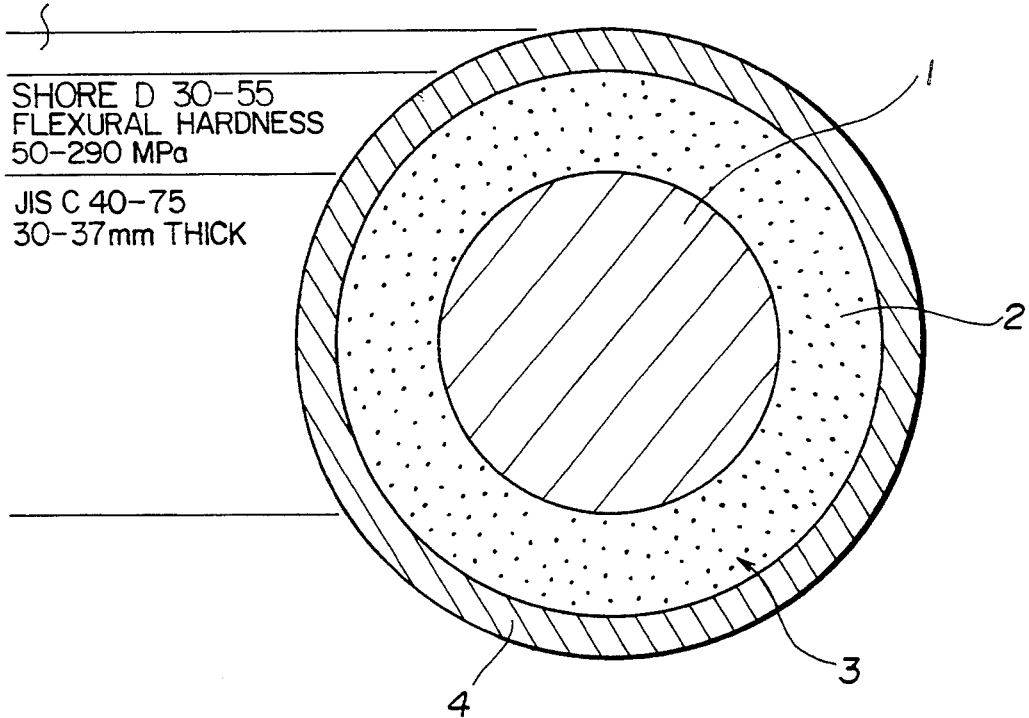

MULTI-PIECE SOLID GOLF BALL

BACKGROUND OF THE INVENTION

1. Field of the Invention

This invention relates to a multi-piece solid golf ball which has superior flying performance, feel on impact and durability and lends itself to mass production.

2. Prior Art

Two-piece solid golf balls are widely used because of the advantage that the amateur golfer can gain increased flying distance. These balls, however, have the disadvantages of an increased run, difficult control and hard hitting feel. The hitting feel can be mitigated by reducing compression at the sacrifice of repulsion and flying distance.

One solution to this problem is a multi-piece solid golf ball wherein the ball structure, especially the solid core section is divided into two, three or more layers having varying hardness, specific gravity and radial thickness (or radius). The conventional multi-piece solid golf balls, however, still leave some problems associated with their manufacture and are not suitable for mass production. By way of illustration, an exemplary three-piece solid golf ball has a two-layer core circumscribed by a cover. The two-layer solid core includes inner and outer layers, both being formed of rubber compositions based on polybutadiene rubber and containing a metal salt of an unsaturated carboxylic acid, a peroxide and the like. The solid core is prepared from these rubber compositions by first forming the core inner layer by a heating, pressing and shaping procedure in a manner as used to form the core of two-piece solid golf balls. The core inner layer is then covered with the core outer layer by first preforming the outer layer composition into a half shell shape in unvulcanized or semi-vulcanized state, and fitting the half shells over the core inner layer followed by a heating, pressing and shaping procedure again. Undesirably, this core preparation process requires more than twice the number of steps required for the preparation of the core of conventional two-piece solid golf balls.

It might be possible, but is impractical to mold and cure the core outer layer rubber composition by an injection molding technique. As is well known in the art, rubber as typified by polybutadiene has many problems against molding that it is poor in flow and requires a long cycle time since curing reaction must be incurred during molding.

Another three-piece golf ball is proposed in Japanese Patent Application Kokai (JP-A) No. 244174/1992 or GB 9117871 and 2248067 as comprising an elastomeric core, an intermediate layer, and a cover of thermoplastic material, the intermediate layer being formed of a thermoplastic composition containing at least 10% by weight, preferably at least 35% by weight of an amide block copolymer based on the total weight of the composition.

There is a need for a multi-piece solid golf ball which is further improved in performance and simplified in manufacturing steps.

SUMMARY OF THE INVENTION

An object of the present invention is to provide multi-piece solid golf ball which is at least comparable in performance to conventional multi-piece sold golf balls having a solid core of a multi-layer configuration formed of polybutadiene rubber base materials and circumscribed by a cover and which lends itself to mass production.

The present invention is directed to a multi-piece solid golf ball comprising a solid core circumscribed by a cover, the solid core being of a multi-layer configuration including a core inner layer circumscribed by at least one core outer layer. If the core outer layer forming material is predominantly comprised of a mixture of (A) 100 to 50% by weight of a polyether ester type thermoplastic elastomer having a Shore D hardness of 30 to 50 and a glass transition temperature of up to $-25°$ C. as measured by a differential scanning calorimeter (DSC) and (B) 0 to 50% by weight of an ionomer in the form of an ethylene-acrylate or ethylene-methacrylate copolymer having a flexural modulus of 200 to 400 MPa, then the core outer layer can be formed by a single stage of injection molding without a need for curing reaction, resulting in a substantial improvement in productivity. The cover is formed of an ionomer in the form of an ethylene-acrylate or ethylene-methacrylate copolymer having a flexural modulus of 200 to 450 MPa and a Shore D hardness of 55 to 68. Then there is obtained a golf ball exhibiting comparable performance to conventional multi-piece solid golf balls having a multi-layer core circumscribed by a cover and formed of rubber compositions containing polybutadiene rubber, a metal salt of an unsaturated carboxylic acid, a peroxide and the like.

More particularly, the polyether ester type thermoplastic elastomer is a material which is basically plastic, but has the same resilience as rubber and which can be mechanically molded, for example, by injection molding and extrusion molding as are conventional plastics. The multi-piece solid golf ball including the core outer layer formed of a material based on this polyether ester type thermoplastic elastomer and the cover formed of a relatively high rigidity ethylene-(meth)acrylate copolymer ionomer does not sacrifice the flying performance and hitting feel, is fully durable, and possesses performance at least comparable to the conventional multi-piece solid golf balls having a multi-layer solid core including inner and outer layers both of rubber compositions and circumscribed by a cover. Although conventional rubber shaping requires multiple steps of mastication, mold introduction (preliminary molding) and vulcanization, the invention eliminates such multiple steps and completes molding in a single step, thus offering great benefits in productivity and processing cost as well as ease of manufacture on a mass scale.

Therefore, the present invention provides a multi-piece solid golf ball comprising a solid core circumscribed by a cover, the solid core being of a multi-layer configuration including a core inner layer circumscribed by at least one core outer layer. The core outer layer is formed of a material predominantly comprising a mixture of (A) 100 to 50% by weight of a polyether ester type thermoplastic elastomer having a Shore D hardness of 30 to 50 and a glass transition temperature of up to $-25°$ C. as measured by differential thermal analysis and (B) 0 to 50% by weight of an ionomer in the form of an ethylene-(meth)acrylate copolymer having a flexural modulus of 200 to 400 MPa. The cover is formed of an ionomer in the form of an ethylene-(meth)acrylate copolymer having a flexural modulus of 200 to 450 MPa and a Shore D hardness of 55 to 68.

BRIEF DESCRIPTION OF THE DRAWING

The only figure, FIG. 1 is a schematic cross section of a three-piece solid golf ball according to one embodiment of the invention.

DESCRIPTION OF THE PREFERRED EMBODIMENT

Referring to FIG. 1, there is illustrated an exemplary three-piece solid golf ball which is one preferred embodiment of the invention. The golf ball includes a solid core 3 of a two-layer configuration consisting of a core inner layer 1 and a core outer layer 2. The solid core 3 is circumscribed by a cover 4. The core inner layer 1 is a solid sphere, the core outer layer 2 is a spherical continuous shell and the cover 4 is a spherical continuous shell. Dimples on the cover 4 are omitted for simplicity's sake. Although the three-piece solid golf ball is illustrated, the present invention is equally applicable to multi-piece solid golf balls in which the solid core includes three, four or more layers.

Generally the core inner layer is formed form a rubber composition of a base rubber blended with a co-crosslinking agent and a peroxide by a heating, pressing and shaping procedure. The base rubber used herein may be polybutadiene rubber or a mixture of polybutadiene rubber and polyisoprene rubber as commonly used in conventional solid golf balls. In the practice of the invention, a base rubber containing at least 90% by weight of 1,4-polybutadiene rubber with at least 90% of a cis-structure is preferably used in order to provide high repulsion. While the co-crosslinking agents commonly used in conventional solid golf balls include zinc and magnesium salts of unsaturated fatty acids such as methacrylic acid and acrylic acid and ester compounds such as trimethylpropane tri-methacrylate, any of these co-crosslinking agents may also be used in the practice of the invention. Zinc acrylate is preferred because of high repulsion. The co-crosslinking agent is preferably blended in amounts of about 10 to 30 parts by weight per 100 parts by weight of the base rubber. Any of well-known peroxides may be used, with dicumyl peroxide and mixtures of dicumyl peroxide and 1,1-bis(t-butylperoxy)-3,3,5-trimethylcyclohexane being preferred. The peroxide is preferably blended in amounts of about 0.5 to 1 part by weight per 100 parts by weight of the base rubber. If desired, the rubber composition may contain other additives, for example, zinc oxide and barium sulfate for specific gravity adjustment and anti-aging agents.

The rubber composition mentioned above is generally formed into a core inner layer or solid sphere by kneading the above-mentioned components in a conventional kneading machine such as a kneader, Banbury mixer and roll mill, introducing the composition into a mold, and shaping the composition under heat and pressure, preferably at 145° to 160° C. The core inner layer or solid sphere generally has a diameter of 30 to 37 mm. If the diameter is less than 30 mm, the entire ball would sometimes have low repulsion. If the diameter exceeds 37 mm, durability against hitting would sometimes become poor. The core inner layer should preferably have a hardness of 40 to 75 JIS C-scale hardness. If the hardness is less than 40, the entire ball would sometimes be too soft and lead to a lowering of hitting durability and repulsion. If the hardness exceeds 75, the entire ball would sometimes be too hard and provide an unpleasant feel on hitting.

The core outer layer is formed from a material predominantly comprising a mixture of (A) 100 to 50% by weight of a polyether ester type thermoplastic elastomer having a Shore D hardness of 30 to 50 and a glass transition temperature of up to $-25°$ C. as measured by differential thermal analysis and (B) 0 to 50% by weight of an ionomer in the form of an ethylene-(meth)acrylate copolymer having a flexural modulus of 200 to 400 MPa, by concentrically injecting molding it around the core inner layer.

The polyether ester type thermoplastic elastomer used herein can be selected from those polyether ester system multi-block copolymers which are synthesized from terephthalic acid or a mixture of terephthalic acid and isophthalic acid and 1,4-butane diol and polytetramethylene glycol (PTMG) or polypropylene glycol (PPG) as polyhydric alcohol components such that the copolymers include hard segments of polybutylene terephthalate (PBT) and soft segments of polytetramethylene glycol (PTMG) or polypropylene glycol (PPG). These multi-block copolymers are commercially available under the trade mark of "Hytrel" from Toray dupont K.K. and "Perprene" from Toyobo K.K. The thermoplastic elastomer has a Shore D hardness of 30 to 50, preferably 35 to 45. Since this type of thermoplastic elastomer is of such nature that high molecular weight crystals sustain hardness and modulus, the lower the hardness and modulus, the higher becomes the impact resilience. Therefore, elastomers having a Shore D hardness of more than 50 are undesirable in resilience whereas elastomers having a Shore D hardness of less than 30 are too soft to use herein irrespective of high impact resilience. Also the thermoplastic elastomer has a glass transition temperature (Tg) of up to $-25°$ C. as measured by a differential scanning calorimeter (DSC). Elastomers with $Tg > -25°$ C. have low impact resilience and greater dependence of impact resilience on temperature and are undesirable to use herein.

By mixing (A) the aforementioned polyether ester type thermoplastic elastomer with (B) 0 to 50% by weight of an ionomer in the form of an ethylene-(meth)acrylate copolymer having a flexural modulus of 200 to 400 MPa, there is obtained the material of which the core outer layer is formed. Since the polyether ester type thermoplastic elastomers are of such nature that high molecular weight crystals sustain hardness and modulus as mentioned above, an elastomer having higher hardness shows lower impact resilience and is thus inadequate for forming the core outer layer. In contrast, the ethylene-(meth)acrylate copolymer ionomer has the nature that the higher the hardness, the higher becomes the impact resilience. When a core outer layer having high hardness is desired, it is effective to blend a certain amount of the ethylene-(meth)acrylate copolymer ionomer with the polyether ester type thermoplastic elastomer. Since the ethylene-(meth)acrylate ionomer shows greater dependence of hardness and impact resilience on temperature, it is undesirable to use the ionomer as a major component of the blend. Therefore, the amount of the ionomer blended is 0 to 50% by weight of the entire mixture provided that the ionomer has a flexural modulus of 200 to 400 MPa. It is preferred to blend a smaller amount of a higher hardness ionomer, more specifically, 0 to 30% by weight of an ionomer having a flexural modulus of 300 to 400 MPa.

If desired, the core outer layer-forming material may further contain proper amounts of weight controllers such as zinc oxide and barium sulfate, anti-oxidants and other additives. The resulting core outer layer-forming composition preferably has a Shore D hardness of 30 to 55 and a flexural modulus of 50 to 270 MPa. Compositions with a flexural modulus of less than 50 MPa would form core outer layers with insufficient hardness whereas compositions with a flexural modulus of more than 270 MPa would adversely affect the feel on hitting.

A solid core of multi-layer configuration is obtained in this way and then covered with a cover having a radial thickness of 1.5 to 2.7 mm. The material of which the cover is made mainly contains an ionomer resin and optionally an inorganic filler such as titanium dioxide for coloring purposes. The ionomer resins used for the cover are ethylene-(meth)acrylate copolymer ionomers having a flexural modulus of 200 to 450 MPa and a Shore D hardness of 55 to 68, which are commercially available under the trade mark of "Surlyn" from E. I. dupont, "Himilan" from Mitsui dupont Chemical K.K., and "Iotec" from Exxon Chemical.

Any of conventional techniques may be used for covering the solid core with the cover, for example, by injection molding the cover material over the core, or by preforming the cover material into half cups and fitting the cups around the core followed by hot press forming.

There is thus obtained a multi-piece solid golf ball in which the core outer layer is made of an injection moldable resilient thermoplastic elastomer so that not only the cover, but also the core outer layer can be formed by injection molding, achieving substantial improvements in productivity over the conventional technique of forming both core inner and outer layers from rubber compositions. In addition, the ball has superior flying performance, pleasant feel on impact, and high durability.

EXAMPLE

Examples of the present invention are given below by way of illustration and not by way of limitation.

Examples 1–5 & Comparative Examples 1–3

Rubber compositions for the core inner layer were prepared by mixing the components in accordance with the formulation of Table 1, kneading the components in a Banbury mixer, and shaping under pressure at 155° C. for 15 minutes into the core inner layer or solid sphere. Then thermoplastic polyester elastomer compositions in accordance with the formulation of Table 1 were injection molded over the core inner layer to produce two-piece solid cores. The conditions under which the core outer layer was injection molded are given below.

| Injection molding conditions | |
|---|---|
| Cylinder temperature | 190° C. at the hopper side |
| | 200° C. at the center |
| | 210° C. at the nozzle side |
| Nozzle temperature | 220° C. |
| Dwell time | 15 seconds |
| Cooling time | 25 seconds |
| Mold temperature | 30° C. |

Cover materials were prepared in accordance with the formulation of Table 1 and injection molded over the two-piece solid cores to produce three-piece solid golf balls having a diameter of 42.8 mm.

Comparative Examples 4–5

Core compositions in accordance with the formulation of Table 1 were kneaded in a Bunbury mixer and shaped under pressure at 155° C. for 15 minutes into solid cores. Cover materials were prepared in accordance with the formulation of Table 1 and injection molded over the cores to produce two-piece solid golf balls having a diameter of 42.8 mm.

Comparative Example 6

There was used a commercially available three-piece solid golf ball in which two core layers were both formed of rubber compositions.

These golf balls are evaluated for hardness, initial speed, impact feel, and index of durability. The results are shown in Table 2.

TABLE 1

| | Example | | | | Comparative Example | | | | | |
|---|---|---|---|---|---|---|---|---|---|---|
| | 1 | 3 | 4 | 5 | 1 | 2 | 3 | 4 | 5 | 6 |
| Core | | | | | | | | | | Commercially available rubbery three-piece golf ball |
| Inner layer composition | | | | | | | | | | |
| Polybutadiene rubber 1) | 100 | 100 | 100 | 100 | 100 | 100 | 100 | 100 | 100 | 100 |
| Zinc acrylate | 15 | 15 | 25 | 25 | 25 | 25 | 25 | 25 | 25 | 35 |
| Zinc oxide | 35 | 35 | 40 | 35 | 35 | 31 | 35 | 50 | 32 | 27 |
| Anti-oxidant | 0.2 | 0.2 | 0.2 | 0.2 | 0.2 | 0.2 | 0.2 | 0.2 | 0.2 | 0.2 |
| Plasticizing aid | 0.2 | 0.2 | 0.2 | 0.2 | 0.2 | 0.2 | 0.2 | 0.2 | 0.2 | 0.2 |
| Dicumyl peroxide | 0.65 | 0.65 | 0.8 | 0.8 | 0.8 | 0.8 | 0.8 | 0.8 | 0.8 | 0.8 |
| 1,1-bis(t-butylperoxy)-3,3,5-trimethylcyclohexane | 0.25 | 0.25 | — | — | — | — | — | — | — | — |
| Outer layer composiition | | | | | | | | | | |
| Polyester thermoplastic elastomer 2) | 100 | 100 | 100 | 100 | 70 | — | — | 100 | — | — |
| Polyester thermoplastic elastomer 3) | — | — | — | — | — | 100 | — | — | — | — |
| Himilan 1605 4) | — | — | — | — | 30 | — | — | — | — | — |
| Polyamide thermoplastic elastomer 5) | — | — | — | — | — | — | 100 | — | — | — |
| Zinc oxide | 7 | 7 | — | — | 7 | — | 14 | — | — | — |
| Cover | | | | | | | | | | |
| Himilan 1706 6) | 50 | 50 | 50 | 50 | 50 | 50 | 50 | 50 | 50 | 50 |
| Himilan 1605 4) | 50 | 50 | 50 | 50 | 50 | 50 | 50 | 50 | 50 | 50 |
| Titanium dioxide | 5 | 5 | 5 | 5 | 5 | 5 | 5 | 5 | 5 | 5 |
| Mgnesium stearate | 0.4 | 0.4 | 0.4 | 0.4 | 0.4 | 0.4 | 0.4 | 0.4 | 0.4 | 0.4 |

TABLE 1-continued

|  | Example | | | | | Comparative Example | | | | | |
|---|---|---|---|---|---|---|---|---|---|---|---|
|  | 1 | 3 | 4 | 5 | 1 | 2 | 3 | 4 | 5 | 6 |
| Ultramarine | 0.02 | 0.02 | 0.02 | 0.02 | 0.02 | 0.02 | 0.02 | 0.02 | 0.02 | 0.02 |

1) JSR BR01 commercially available from Nippon Synthetic Rubber K.K.
2) Hytrel 4047 (Shore D hardness 40, Tg - 40° C.) commercially available from Toray duPont K.K.
3) Hytrel 5557 (Shore D hardness 55, Tg - 20° C.) commercially available from Toray duPont K.K.
4) Na type ionomer (flexural modulus 370 MPa) commercially available from Mitsui duPont Polychemcial K.K
5) PAE 1202 (Shore D hardness 42) commercially availabe from Ube Kosan K.K.
6) Zn type ionomer (flexural modulus 330 MPa) commercially available from Mitsui duPont Polychemical K.K.

TABEL 2

|  |  | Example | | | | | Comparative Example | | | | | |
|---|---|---|---|---|---|---|---|---|---|---|---|---|
|  |  | 1 | 2 | 3 | 4 | 5 | 1 | 2 | 3 | 4 | 5 | 6 |
| Core |  |  |  |  |  |  |  |  |  |  |  | Commercially |
| Diameter (mm) | Inner layer | 30.0 | 32.0 | 31.6 | 35.2 | 35.2 | 35.2 | 35.2 | 27.8 | 38.5 | 38.5 | available |
|  | Inner + Outer layer | 38.0 | 38.0 | 38.5 | 38.8 | 38.8 | 38.8 | 38.8 | 38.5 | 38.5 | 38.5 | rubbery three-piece |
| Hardness (JIS C scale) | Core inner layer | 51 | 51 | 72 | 72 | 71 | 71 | 72 | 71 | 70 | 81 | golf ball |
| Specific gravity | Core inner layer | 1.18 | 1.18 | 1.22 | 1.19 | 1.19 | 1.17 | 1.19 | 1.28 | 1.18 | 1.18 |  |
|  | Core outer layer | 1.18 | 1.18 | 1.12 | 1.12 | 1.12 | 1.19 | 1.12 | 1.12 | — | — |  |
| Weight (g) |  | 33.9 | 33.9 | 35.1 | 35.9 | 35.9 | 35.9 | 35.9 | 35.2 | 35.2 | 35.2 |  |
| Hardness 1) |  | 5.1 | 5.3 | 3.77 | 3.76 | 3.40 | 2.90 | 3.71 | 3.59 | 4.1 | 2.7 |  |
| Cover |  |  |  |  |  |  |  |  |  |  |  |  |
| Thickeness (mm) |  | 2.4 | 2.4 | 2.1 | 2.0 | 2.0 | 2.0 | 2.0 | 2.1 | 2.1 | 2.1 |  |
| Hardness (Shore D) |  | 62 | 62 | 63 | 63 | 63 | 63 | 63 | 63 | 63 | 63 |  |
| Ball properties |  |  |  |  |  |  |  |  |  |  |  |  |
| Weight (g) |  | 45.1 | 45.1 | 45.3 | 45.3 | 45.3 | 45.3 | 45.2 | 45.3 | 45.3 | 45.2 | 45.2 |
| Hardness 1) |  | 3.16 | 3.40 | 2.82 | 2.94 | 2.89 | 2.37 | 2.90 | 2.82 | 3.01 | 2.2 | 2.6 |
| Outer diameter (mm) |  | 42.8 | 42.8 | 42.7 | 42.7 | 42.7 | 42.7 | 42.7 | 42.7 | 42.7 | 42.7 | 42.8 |
| Initial spped 2) (m/s) |  | 76.92 | 77.01 | 77.11 | 77.35 | 77.38 | 76.15 | 76.30 | 76.50 | 77.0 | 77.6 | 77.4 |
| Impact feel 3) |  | ⊚ | ⊚ | ⊚ | ⊚ | ⊚ | X | ○ | ○ | ⊚ | X | ⊚ |
| Index of durability 4) |  | 60 | 55 | 75 | 70 | 70 | 80 | 70 | 75 | 45 | 100 | 30 |

1) Hardness is expressed by a distortion (mm) of the core or ball under a load of 100 kg. Greater values imply softness.
2) Initial speed is measured by the same type of meter as the R&A initial speed meter (USGA) used in the golf ball certification test.
3) A physical feel on impact test was made by professional golfers with evaluation made on the following criterion.
⊚: excellent
○: good
X: bad
4) The ball was repeatedly hit by means of a robot machine at a head speed of 590 m/s until it was broken. The number of hits until breakage was expressed as an index based on 100 for Comparative Example 5 (conventional two-piece golf ball).

As seen from Table 2, the three-piece golf balls within the scope of the invention are substantially improved in productivity since the core outer layer can be injection molded. At the same time, these balls show excellent performance including an initial speed comparable to the conventional two-piece golf ball as well as pleasant feel on impact and improved durability.

Although some preferred embodiments have been described, many modifications and variations may be made thereto in the light of the above teachings. It is therefore to be understood that within the scope of the appended claims, the invention may be practiced otherwise than as specifically described.

We claim:

1. A multi-piece solid golf ball comprising, a solid core circumscribed by a cover, the solid core being of a multi-layer configuration including a core inner layer circumscribed by at least one core outer layer, wherein
said core outer layer is formed of a material predominantly comprising a mixture of 100 to 50% by weight of a polyether ester type thermoplastic elastomer having a Shore D hardness of 30 to 50 and a glass transition temperature of up to −25° C. as measured by differential thermal analysis and 0 to 50% by weight of an ionomer in the form of an ethylene-(meth)acrylate copolymer having a flexural modulus of 200 to 400 MPa, and
said cover is formed of an ionomer in the form of an ethylene-(meth)acrylate copolymer having a flexural modulus of 200 to 450 MPa and a Shore D hardness of 55 to 68.

2. The multi-piece solid golf ball of claim 1 wherein said core inner layer is formed by heat curing a rubber composition comprising polybutadiene rubber, zinc acrylate, and a peroxide as essential components and has an outer diameter of 30 to 37 mm.

3. The multi-piece solid golf ball of claim 2, wherein said core inner layer has a JIS-C hardness in the range of 40–75.

4. The multi-piece solid golf ball of claim 1, wherein said core inner layer comprises a base rubber containing at least 90% by weight of 1.4-polybutadiene rubber with at least 90% of a CIS-structure.

5. The multi-piece solid golf ball of claim 1, wherein said thermoplastic elastomer has a Shore D hardness of 35–45.

6. The multi-piece solid golf ball of claim 1, wherein said core outer layer has a Shore D hardness of 30 to 55 and a flexural modulus of 50–270 MPa.

* * * * *